US011216698B2

United States Patent
Colligan et al.

(10) Patent No.: US 11,216,698 B2
(45) Date of Patent: Jan. 4, 2022

(54) TRAINING A NON-REFERENCE VIDEO SCORING SYSTEM WITH FULL REFERENCE VIDEO SCORES

(71) Applicant: Spirent Communications, Inc., San Jose, CA (US)

(72) Inventors: Michael Colligan, Sunnyvale, CA (US); Jeremy Bennington, Greenwood, IN (US)

(73) Assignee: Spirent Communications, Inc., San Jose, CA (US)

( * ) Notice: Subject to any disclaimer, the term of this patent is extended or adjusted under 35 U.S.C. 154(b) by 0 days.

(21) Appl. No.: 16/216,699

(22) Filed: Dec. 11, 2018

(65) Prior Publication Data

US 2019/0258902 A1    Aug. 22, 2019

Related U.S. Application Data

(60) Provisional application No. 62/710,458, filed on Feb. 16, 2018.

(51) Int. Cl.
    *G06K 9/62*    (2006.01)
    *G06K 9/00*    (2006.01)
    (Continued)

(52) U.S. Cl.
    CPC ....... *G06K 9/6262* (2013.01); *G06K 9/00718* (2013.01); *G06K 9/6256* (2013.01);
    (Continued)

(58) Field of Classification Search
    None
    See application file for complete search history.

(56) References Cited

U.S. PATENT DOCUMENTS

2013/0027568 A1* 1/2013 Zou .............. H04N 17/004
                                                    348/192
2013/0293725 A1* 11/2013 Zhang .............. H04N 17/02
                                                    348/180

(Continued)

FOREIGN PATENT DOCUMENTS

CN        108090902 A   * 12/2017

OTHER PUBLICATIONS

Kayargadde et al., "Perceptual characterization of images degraded by blur and noise: model", Institute for Perception Research, P.O. Box 513, 5600 MB Eindhoven, The Netherlands, Journal of the Optical Society of America A, vol. 13, No. 6, Jun. 6, 1996, pp. 1178-1188.

Seshadrinathan, et al., "A Subjective Study to Evaluate Video Quality Assessment Algorithms", Intel Corporation, Chandler, AZ—USA. The University of Texas at Austin, TX—USA., Jan. 1, 2010, 10 pages.

(Continued)

*Primary Examiner* — Fan Zhang
(74) *Attorney, Agent, or Firm* — Haynes Beffel & Wolfeld, LLP; Ernest J. Beffel, Jr.

(57) ABSTRACT

The disclosed technology teaches training a NR VMOS score generator by generating synthetically impaired images from FR video using filters tuned to generate impaired versions and applying a FR VMOS generator to pairs of unimpaired FR images from the FR video and the impaired versions of the FR images to create ground truth scores for the impaired versions. The disclosed method also includes training by machine learning model an image evaluation classifier using the ground truth scores and the impaired versions to generate NR VMOS scores, and storing coefficients of the image evaluation classifier for use as the NR VMOS score generator. Also disclosed is generating a NR VMOS score by invoking the trained NR VMOS score generator, with stored coefficients generated by feeding the trained NR VMOS score generator with images captured (Continued)

from scenes in a video to be scored, and evaluating the images to generate NR VMOS scores.

19 Claims, 8 Drawing Sheets
(5 of 8 Drawing Sheet(s) Filed in Color)

(51) Int. Cl.
    *G06N 3/08*     (2006.01)
    *G06N 20/10*     (2019.01)
    *G06T 5/20*     (2006.01)

(52) U.S. Cl.
    CPC ............... *G06N 3/08* (2013.01); *G06N 20/10* (2019.01); *G06T 5/20* (2013.01)

(56) References Cited

U.S. PATENT DOCUMENTS

2015/0365725 A1* 12/2015 Belyaev ............. H04N 21/8133
                                                                                                725/46
2016/0353138 A1   12/2016 Bennington
2016/0358321 A1* 12/2016 Xu ......................... G06K 9/036

OTHER PUBLICATIONS

Farias, et al., "Perceptual Contributions of Blocky, Blurry, and Fuzzy Impairments to Overall Annoyance", Proceedings of SPIE, vol. 5292, Department of Electrical and Computer Engineering, Department of Psychology, UCSB, Santa Barbara, CA 94106 USA, Jun. 2004, pp. 109-120.

* cited by examiner

FIG. 3 Pristine

FIG. 4 Blur

FIG. 5 Noise

FIG. 6 Block

TRAINING A NON-REFERENCE VIDEO SCORING SYSTEM WITH FULL REFERENCE VIDEO SCORES

RELATED APPLICATIONS

This application is related to U.S. Provisional Patent Application No. 62/710,458, entitled "TRAINING A NON-REFERENCE VIDEO SCORING SYSTEM WITH FULL REFERENCE VIDEO SCORES", filed Feb. 16, 2018, which is hereby incorporated by reference for all purposes.

FIELD OF THE TECHNOLOGY DISCLOSED

This technology disclosed applies to the field of NR VQA (non-reference perceptual video quality analysis). Specifically, it is focused on the process to create training data sets and use absolute FR VQA (full reference perceptual video quality analysis) scores and machine learning techniques to produce a NR VQA scoring system.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

NR VQA methods typically have relied on custom mathematical formulas to approximate mean opinion scores (MOS). See, e.g., U.S. Pat. No. 9,380,297, "Video Streaming and Video Telephony Uplink Performance Analysis System". NR VQA custom formulas may also not be feasible due to limitations in the availability of relevant subjective VQA data used to validate the formulas.

FR VQA evaluators require a reference pristine example of the video, so they can perform a pixel-wise comparison of the reference example to the scored example. The FR VQA evaluator does not include any absolute standard of quality. As a result, if one reverses the order of samples, it will happily treat the degraded example as reference and score the pristine example for fidelity to the degraded example.

A small set of reference pristine example videos and subjectively scored degraded examples is presently available, due to the cost of reliable subjective scoring, on the order of 1,000 subjectively scored sets of pristine and degraded examples. This is too small a sample to use as an effective training set.

An opportunity arises to use full reference (FR) video and FR video mean opinion score (VMOS) to generate synthetically impaired video with VMOS, as training data to train machine learning models to produce no-reference NR VMOS scoring. This approach can overcome both cost and time constraints inherent in full reference perceptual video quality analysis. The disclosed technology is especially valuable in use cases in which there is no access to the original video content.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of the summary is to present some concepts related to some exemplary non-limiting implementations in a simplified form as a prelude to the more detailed description of the various implementations that follow.

This technology disclosed has been created to address the need of video testers to determine the perceived quality of video found in video distribution systems in the absence of pristine reference videos that could be paired with distributed video for evaluation using FR VQA methods.

Furthermore, there is a need to correlate the VQA or video mean opinion scores (VMOS) produced by the technology disclosed to VQA or VMOS scores produced using standardized full reference VQA methods.

The disclosed technology for training a no-reference video mean opinion score (NR VMOS) score generator includes generating synthetically impaired images from FR video, using filters tuned to generate impaired versions of the FR video and applying a FR VMOS generator to pairs of unimpaired FR images from the FR video and the impaired versions of the FR images to create ground truth scores for the impaired versions. The technology teaches training by machine learning model an image evaluation classifier using the ground truth scores and the impaired versions to generate NR VMOS scores, and storing coefficients of the image evaluation classifier for use as the NR VMOS score generator. The disclosed technology also includes generating NR VMOS using the trained NR VMOS score generator, by invoking the trained NR VMOS score generator with the stored coefficients, feeding the trained NR VMOS score generator with at least three images captured from different scenes in a video sequence to be scored, evaluating the images to generate NR VMOS scores, and combining the NR VMOS scores from the images to generate a video sequence NR VMOS score for the video sequence.

A large advantage gained with this disclosed technology is that the NR VQA models can be trained entirely on data that is derived from synthetically impaired video, calibrated to FR VQA methods, both of which can be entirely automated to generate large to very large datasets. Most machine learning approaches improve, in terms of prediction precision, as training dataset sizes increase. SVM classifiers specifically improve as features increase and as the available support vectors increase. For NR model training, most supervised learning techniques will work and will benefit from automated dataset generation. Specifically, we see good correlation between NR VQA scores and FR VQA scores from supervised learning techniques including SVM classification, linear regression, random forest classification, and random forest regression. We also expect CNNs and hybrid CNNs to produce good correlations between NR VQA scores and FR VQA scores from supervised learning techniques. In all cases, we are differentiating a set of selected and measurable impairments from naturally occurring image features and attributing a subjective mean opinion score to those impairments.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

Figure 1:
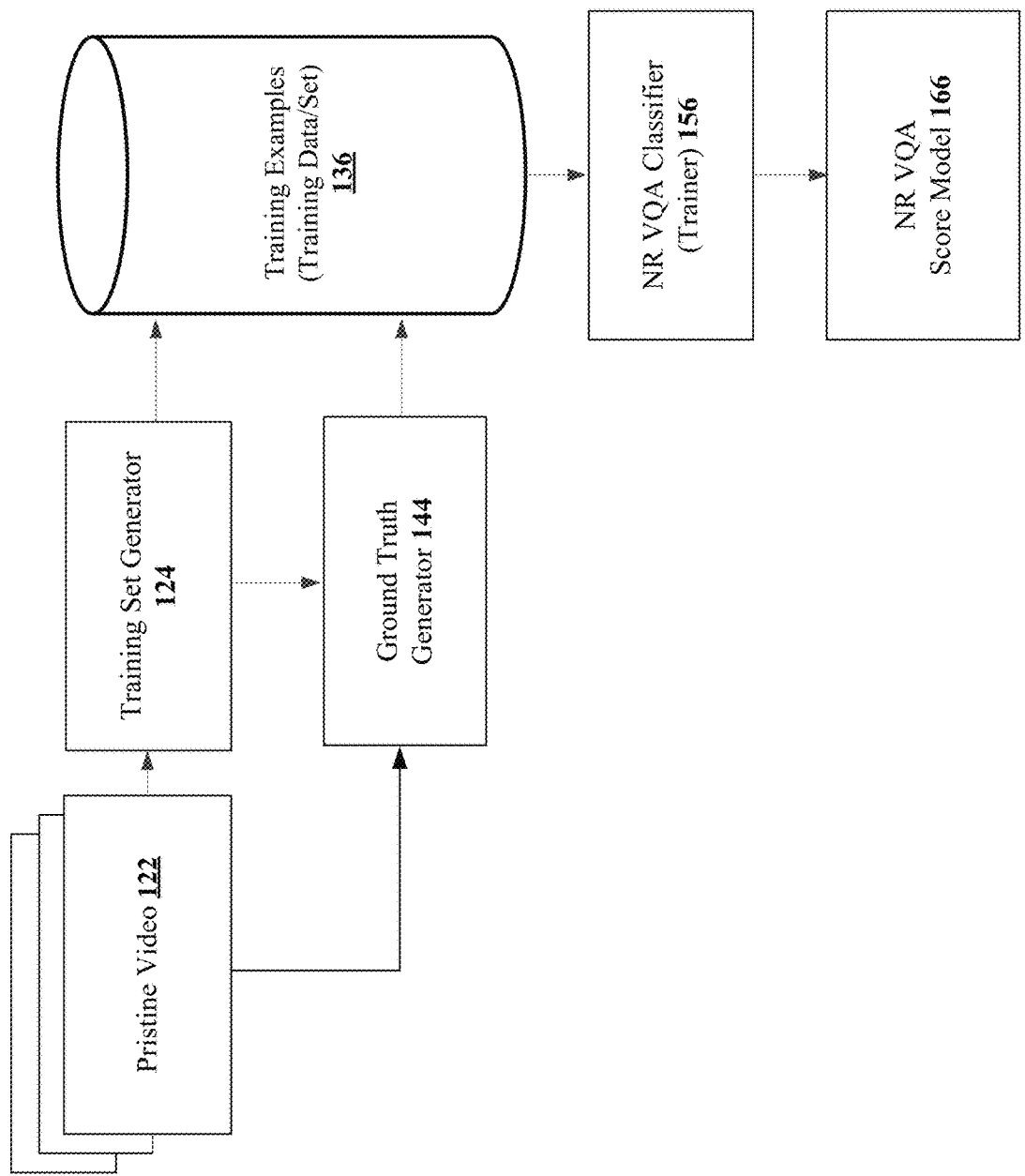
FIG. 1 depicts example architecture for generating NR training data using full reference (FR) video and FR video mean opinion score (VMOS), generating synthetically impaired videos using filters tuned to generate impairments that approximate the reference FR VMOS video and score.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Network operators who are delivering video over mobile and broadband networks need an objective way to evaluate video quality. For example, media-services providers such as Netflix, Amazon Prime, HBO Go and Hulu need to be able to test the quality of the video services they provide, even though the media-services provider is not the owner of the video content or the network service. For video performance benchmarking, because the media-services providers do not have access to a pristine version of a video presentation for comparison to an impaired video version, full-reference video quality analysis (FR VQA) techniques are not an option.

Video performance benchmarking in mobile networks in the field helps media-service providers determine how well their networks deliver HBO to mobile handsets, compared to the networks of other providers. Smart TV and other device vendors can regression test new software releases in the lab. Video performance benchmarking also enables video services providers to understand how their applications consume network bandwidth and how well they fare when the network is less than ideal.

Builders of content services and video devices also need an objective way to evaluate video quality during development of new devices. In one example, a developer needs to be able to receive, decode and display video using beta versions of their firmware and then be able to change their display driver firmware and retest.

Humans do not need an A-B comparison to determine how good something looks. We recognize blockiness, blurriness and choppy motion as the impairments that they are. Using a kind of artificial intelligence known as machine learning technology, systems are able to automatically recognize these artifacts by evaluating the displayed video, and then scoring the video with a metric that correlates tightly to human perceptual scores. A learning algorithm is typically tested for impaired videos relative to ground truth scores from subjective testing with humans. A neural-network-based learning system can be trained to score videos, using a large training set, as machine learning models improve, in terms of prediction precision, as the training data set size increases.

NR algorithms could be trained on subjectively scored video samples and scores, but this approach is limited by the short supply of subjectively scored video and the cost of collecting subjective scores in large quantities. It is both expensive and time consuming to collect subjective scores even in small quantities. For example, fifty college students can be tasked to rate hundreds to thousands of images, which will yield only 5,000 to 50,000 data points.

The disclosed technology enables video testers to determine the quality of transmitted video, scoring video quality on a 1 to 5 video mean opinion score (VMOS) scale, without needing to compare the video to a pristine full reference video. Our technology enables training a NR VQA classifier or neural network on videos and video scores generated by accepted and standardized FR VQA algorithms. The disclosed technology overcomes both the cost and time constraints by automating the generation of the training data in the form of artificially impaired videos, the generation of training scores, and the production of the models that are used by the NR VQA classifier to score test videos. A system for generating non-reference (NR) training data is described next.

Figure 3:
FIG. 3 shows an example image from a pristine video.

FIG. 1 depicts example architecture 100 for generating NR training data using full reference (FR) video and FR video mean opinion score (VMOS), generating synthetically impaired videos using filters tuned to generate impairments that approximate the reference FR VMOS video and score. Video artifacts can be introduced at many points along the video distribution and reproduction chain: at video capture, during encoding, while traversing the network, and during decoding and display. An assumption is made that the more similar a set of training videos are to the type of videos to be performance benchmarked, the more precisely the results will predict subjective scores for similar test videos. In some implementations, the training can be performed using families of similar training videos, such as training separately for high-motion-content videos and for low-motion-content videos. Pristine video 122 includes a set of pristine videos of the highest quality available according to subjective analysis by relative experts in the video field, chosen such that their quality is greater than or equal to the intended use for the subsequently created score generator. FIG. 3 shows an example image from a pristine video. For example, to create a score generator for analyzing highly compressed 1920×

1080 resolution videos, pristine video 122 includes lightly compressed or uncompressed video of equal resolution to 1920×1080, and subjective VMOS of 5.0 or nearly 5.0, to establish an absolute reference point for ground truth generator 144, which provides relative video quality scores.

Pristine video 122 is input to training set generator 124 that produces a training dataset that contains a large number of calibrated impaired video sample clips, based on the pristine full reference video, and stores the video sample clips in training examples 136. Training set generator 124 transcodes pristine video with various quality-affecting settings such as quantization parameter, constant rate factor and the application of various image filters. The resulting videos exhibit one or more impairments and various degrees of impairments. The types and degrees of impairments determine the ability of the resulting score generator to accurately detect the same. Types and degrees of impairment can be varied independently of each other, and can be mixed and matched. Rather than a training set with a few key types of artifact samples spread across a few select types of scenes, training set generator 124 covers a vast array of artifact samples, with each type of artifact and each degree of distortion being represented in a wide variety of video content. Example impaired video sample clips include camera artifacts, coding and compression artifacts, and network distribution artifacts. Rather than using a dataset limited to hundreds of samples, the disclosed training dataset contains literally hundreds of thousands of sample videos. We describe further details of types of impairments and the resulting analysis opportunities infra.

Continuing the description of architecture 100, ground truth generator 144 utilizes pristine video 122, receives the calibrated impaired video sample clips from training set generator 136, generates associated video quality scores for each video sample clip, and stores each video sample clip with its respective score in training examples 136. That is, ground truth generator 144 is a FR VQA system used together with pristine FR video and synthetically impaired videos to produce very large amounts of scored training data.

Figure 5:
FIG. 5 shows an example resulting image with noise impairment, relative to the pristine image shown in FIG. 3.

Further description of types of video impairments and the resulting analysis opportunities are offered. Consider camera artifacts arising from errors in photography rather than from other sources such as damaged hardware. Photographic errors are generally related to issues with improper lighting or focus. Insufficient lighting leads to a grainy appearance and a loss of detail. Training set generator 136 can create these effects synthetically by applying a grainy image filter to each of the frames in a video sequence. Such image filters are available in common video editing software such as FFMPEG. Grainy filters can be used to apply varying degrees of noise to some or all areas of frames. FIG. 5 shows an example resulting image with noise impairment as can be seen in graininess 524, relative to the pristine image shown in FIG. 3. By varying the degree of graininess applied to an otherwise pristine video and by using ground truth generator 144, a FR VQA system, to score the resulting video, the level of graininess that corresponds to a VMOS score can be determined and a family of grainy training videos, each with a varying level of graininess and with a known effect on VMOS can be generated.

Figure 4:
FIG. 4 shows an example resulting image with blurriness impairment, relative to the pristine image shown in FIG. 3.

Training set generator 136 also creates training videos with focus impairments, in this case, applying a blur filter. Blurring is the result of improper focus on the image subject or a shutter speed that is too slow for the relative motion of the image subject. Training set generator 136 applies the blur filter to apply varying degrees of blur to some or all areas of video frames of an otherwise pristine video. As described supra, ground truth generator 144 scores the resulting videos to determine what level of blurriness corresponds to what VMOS score. Training set generator 136 then creates a family of blurry training videos each with a varying level of blurriness and with a known effect on VMOS. FIG. 4 shows an example resulting image with blurriness impairment, relative to the pristine image shown in FIG. 3. The athlete's sleeve 466 is particularly blurry.

Figure 6:
FIG. 6 shows an example image with block-based impairment, relative to the pristine image shown in FIG. 3.

Compression and coding artifacts that we consider arise from insufficient bandwidth allocation during the encoding process. We recognize that most modern codecs use a form of block-based lossy compression to reduce data size. Video frames are divided into blocks of pixels of various sizes and then each block is encoded separately. The result of this process is that there can be image discontinuities along pixel block boundaries. These blocky edges may be quite noticeable and may have a large effect on video quality perception. FIG. 6 shows an example resulting image with block-based impairment as seen in the athlete's forearm 626, relative to the pristine image shown in FIG. 3.

Training set generator 136 synthesizes blockiness artifacts by over-compressing training videos. There are three ways that we can do this. In each case we start with a pristine video. In the first case we use the CRF (constant rate factor) option in our transcoding process. CRF is a setting that will cause the encoder to attempt to maintain a specified level of quality regardless of the number of bit that must be allocated to do so. CRF values range from 0 to 51 where 0 is the highest level of quality and 51 is the lowest. For example, if we transcode a pristine video with all attributes remaining the same as the original but with a CRF value of 25, we can create an impaired video with reduced quality that is consistent frame to frame throughout the video. If we then score this video using ground truth generator 144, a FR VQA system, we see consistent VMOS scores frame to frame. By transcoding the pristine video using all possible CRF values training set generator 136 offers a family of impaired videos with a full range of compression impairments.

In the second case we use the QP (quantization parameter) option in our transcoding process. QP is a setting that will cause the encoder to remove high frequency DCT (discrete cosine transformation) coefficients that are smaller than the specified QP value from the resulting compressed video data. The effect of doing this is that fine image details smaller than the specified QP setting will be lost. The higher the QP value, the more detail that is lost and the smaller the resulting video data size. Visually, the loss of detail is equivalent to blurry edges. QP values range from 1 to 31 where 1 is the lowest quality setting and 31 is the highest. Unlike CRF, the QP option does not produce a uniform quality level from frame to frame. Instead, it is used to reduce the size of the video data by removing a certain level of detail from the entire video. For example, if we transcode a pristine video with all attributes remaining the same as the original but with a QP value of 15, we can create an impaired video with reduced quality that has roughly the same level of detail from frame to frame throughout the video. If we then score this video using a FR VQA method, we would expect to see different VMOS scores frame to frame depending on how much detail a frame originally contained. By transcoding the pristine video using all possible QP values training set generator 136 provides a family of impaired videos with a full range of compression impairments.

In a third case we use the B (bitrate) option in our transcoding process. B is a setting that will cause the encoder to maintain a fairly constant bitrate that can be configured to not exceed a maximum bitrate. The net effect of doing this is that frames with a high amount of detail will be more highly compressed than frames with a low amount of detail. Those that are more highly compressed will be more impaired. Visually, the higher the level of compression the more we would expect to see both blocky edges as well as the loss of fine details. The bitrate may be set to correspond to the target distribution system for our model. For example, if we wish to train a model that can be used to score videos distributed over a 3 Mbps network channel, we may choose our transcoding bitrate to be 3 Mbps or less. We start with a pristine video that has a higher bitrate than our target bitrate and then transcode it with a variety of bitrates such that it meets the expected distribution system's bitrates. If we then score these videos using ground truth generator 144 we see VMOS scores that generally increase as the bitrate increases.

Distribution system artifacts that we consider are those arising from the loss of video data as it is transmitted to an end-point, in one implementation. In a buffered video delivery system, loss of data results in one of two impairments. Either the video will freeze on the last successfully received frame or it will display the absence of a frame (which may involve displaying some indicator that it is waiting for the next frame).

A video freeze can be synthesized simply by transcoding a pristine video but with a frame repeat option used on one or more segments of the video. When ground truth generator 144 scores the resulting video, repeated frames with the same VMOS score as the first repeated frame in the series or show a reduced VMOS score for repeated frames to reflect the fact that it is impaired, depending on the implementation.

A black frame or stalled video impairment can be synthesized by splicing black, nearly black, or stall indication video segments into an otherwise pristine video during the transcoding process. A stall indication video segment example is the black frame with spinning progress wheel sometimes seen during on-demand video streaming when re-buffering occurs. When ground truth generator 144 scores the resulting video it will either produce a high VMOS score indicating that the screen is black and not impaired, or it will interpret the repeated black frames as impairment and score those frames as a low VMOS score, dependent on the use case and implementation.

In both examples of stalled video delivery, additional information is required to determine if the video is impaired or if the video sequence does indeed contain legitimate segments with little or no motion or information. For NR model training, such frames will be interpreted as having a VMOS of 5 and it is up to the NR VQA method using the NR model to determine if the distribution system has been impaired. This can be determined by measuring network activity, by comparing the temporal and spatial information measurements to known stall indications, or by a combination of both approaches.

Applying filters to pristine videos and scoring the resulting videos with a FR VQA ground truth generator 144, rather than subjective human scoring, is what makes the disclosed technology unique. No subjective scores are required for this automated process, so it can be scaled to a very large number of training videos.

With pristine video 122 and impaired versions of those videos with known types and degrees of impairments as training examples 136, ground truth generator 144 utilizes input pristine and impaired pairs of the same video in a FR VQA process, which produces a DMOS (differential video mean opinion score) for each pair. Since the reference videos were chosen to be the highest level of quality, the resulting DMOS scores can be taken as absolute scores, not merely differential scores. This is important since we want to know the absolute VMOS scores of the impaired videos.

With FR absolute VMOS scores and with the associated impaired videos we can now use these pairs to train our NR VQA classifier 156. We start by computing feature scores for a designated set of video characteristics for each impaired video and then associate those feature scores to the FR absolute VMOS score for each impaired video. Then, we use the features scores and the VMOS score as a support vector to use in SVM (support vector machine) training. The complete set of support vectors used (i.e. the complete set of impaired videos, video feature scores, and absolute VMOS scores) are then used to build a hyperplane regressor which represents NR VQA score model 166. That is, these scored training examples 136 are the training set inputs for training NR VQA classifier 156, which can be implemented as a support vector machine (SVM), utilizing the resultant dataset of training examples 136 and generating VQA scores that correlate closely with a FR VQA system. An SVM trained model improves in accuracy and effectivity as the number of data points increases. One implementation of this architecture utilizes a cloud computation platform capable of processing thousands, if not millions, of iterations (such as Amazon EC2) which can process the number of videos and produce the number of support vectors required to create accurate video scores within a reasonable number of hours or days. Other classifiers can also be used.

Training pairs of example videos and scores, without reference to a corresponding pristine video, can also be used to train a neural network model such as a multi-layer convolutional neural network (CNN) or hybrid LSTM/CNN network in some implementations. Each frame or just a sampling of frames can be used, as the VQA depends more on the quality of individual frame than time dependent relationship among frames. Implementations for specific use cases can combine the use of data for the specific video environments to be tested, and can emphasize detection of a variety of artifacts, including NR compression, NR buffering and NR scaling.

The trained NR VQA classifier 156 input for NR VQA score model 166 is not dependent on full reference video. In one implementation, NR VQA score model 166 is implemented based on a variation of Blind/Referenceless Image Spatial Quality Evaluator (BRISQUE) no-reference video quality assessment, a state-of-the-art natural scene assessment tool developed at the University of Texas at Austin's Laboratory for Image and Video Engineering (LIVE). BRISQUE has become one of the most-used quality assessment tools in broadcast and content production environments.

Figure 2:
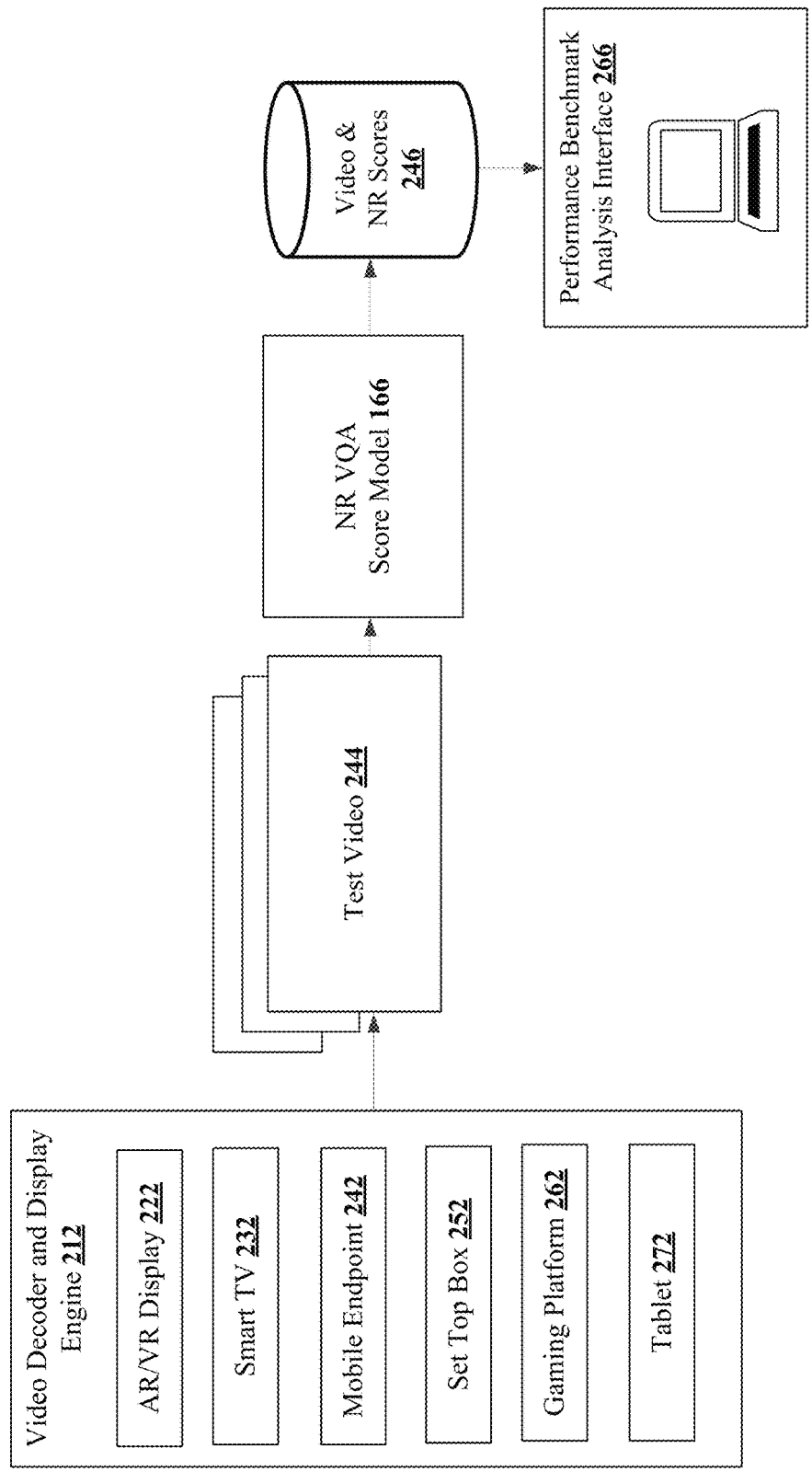
FIG. 2 depicts example test architecture for performing NR VQA on test videos, for which access to pristine full reference video is not available for comparison.

FIG. 2 depicts example test architecture 200 for performing NR VQA on test videos, for which access to pristine full reference video is not available for comparison. Video decoder and display engine 212 captures and decodes videos from many sources: augmented reality and virtual reality AR/VR display 222, smart TV 232, mobile endpoint 242, set top box 252, gaming platform 262 and table 272 as test video 244. Examples of augmented reality experiences include Snapchat lenses and the game Pokemon Go. Virtual reality (VR) implies a complete immersion experience that shuts out the physical world. Video decoder and display engine 212 can also capture and decode videos from additional video sources not explicitly named here. Test video 244 gets scored using NR VQA score model 166 which has been previously generated as described relative to architecture 100. NR VQA score model 166 process begins by computing features scores for a designated set of video characteristics for each test video and uses the results of training with a very large NR data set with hundreds of thousands of samples, as described previously, to determine what NR VMOS value to associate with those feature scores. The result is an absolute NR VMOS for each test video, which can be stored in video and NR scores 246 and can be utilized for performance benchmarking either automatically or by an operator via performance benchmark analysis interface 266.

Comparison to a well-known metric shows over 90% correlation between the intended score and results obtained using the disclosed technology. VMAF, the Video Multimethod Assessment Fusion metric developed by Netflix and the University of Southern California, is a well-known metric that is one of the best in the industry. The VMAF video scoring system combines human perceptual vision modeling with artificial intelligence to produce a 1-to-100 scale quality score. Note that VMAF relies on a pristine reference video for comparison. VMAF has been shown to be superior to many other algorithms in terms of its ability to produce a score that is well correlated to how people rate video quality. In another implementation, the disclosed non-reference NR VMOS model can be trained to model a different VMOS model, such as peak signal-to-noise ratio (PSNR), perceptual evaluation of video quality (PEVQ) or structural similarity index (SSIM), instead of VMAF. The disclosed technology produces video sequence NR VMOS scores for the video sequences that can satisfy a predetermined correlation with standards-based FR VMOS scores.

We use a four-step process to determine how well the disclosed technology compares to the full-reference VMAF metric. First, we create a score baseline data set containing several thousand video clips, beginning with source videos that contain a wide variety of scene types that vary in image complexity, lighting, color and other attributes. Each clip is encoded multiple times at varying levels of compression to produce a large data set containing the types of video anomalies that are produced by compression encoding. As the degree of compression increases the encoder typically ignores fine details and uses larger block sizes, causing blurriness and blockiness in the rendered video, as described supra. Next, we generate a VMAF score for every clip in the data set by passing the data set through the VMAF full-reference algorithm for scoring videos, to obtain a baseline dataset of video clips with VMAF scores for a wide variety of scene types and compression levels. The baseline dataset also contains the reference video associated with each of the encoded clips. In the third step we run the encoded clips in the baseline dataset through the disclosed NR VQA score generator to produce a video quality score for each, which at this stage, like VMAF, is producing a 1 to 100 score. Unlike VMAF, of course, the disclosed technology only "sees" the compressed clip, not the reference video. As the last step, we observe the correlation between the intended score (VMAF's score) and the score generated using the disclosed technology, for each of the thousand compressed clips in the baseline dataset.

Figure 7:
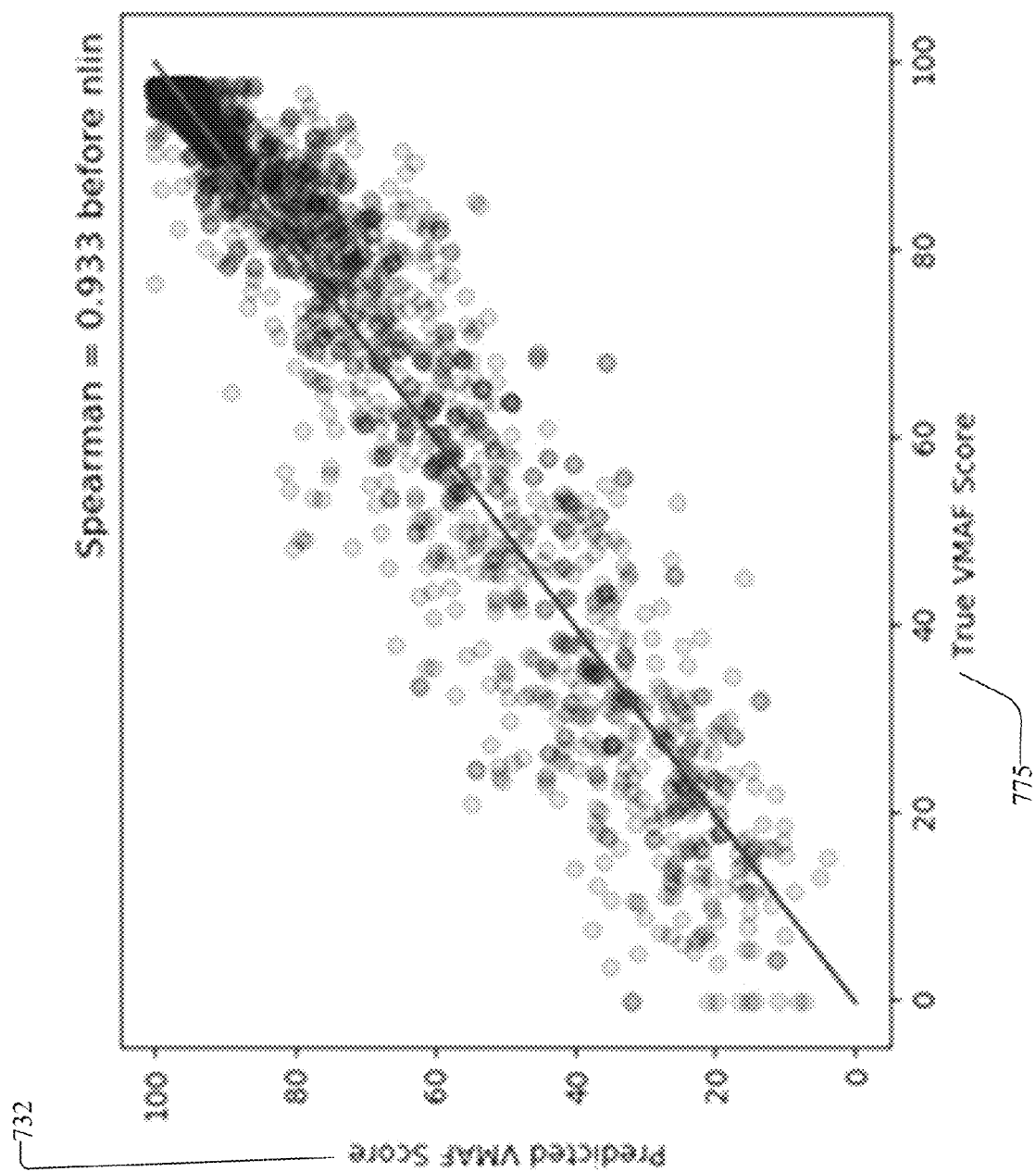
FIG. 7 shows a Spearman correlation graph of true VMAF score and predicted VMAF score obtained using the disclosed technology for training machine learning models to produce no-reference NR VMOS scoring.

FIG. 7 shows a Spearman correlation graph of true VMAF score 775 and predicted VMAF score 732 obtained using the disclosed technology for training machine learning models to produce no-reference NR VMOS scoring. Spearman's rank correlation uses statistics to assess how well the relationship between two variables can be described using a monotonic function. The disclosed technology achieves a Spearman correlation of more than 90% with the VMAF score across the entire baseline dataset.

The disclosed non-reference NR VMOS model offers a very good method of scoring video content without employing a reference for comparison. Using the attributes of the underlying BRISQUE machine learning quality assessment tool and the multi-petabyte training dataset (multiple millions of gigabytes), the disclosed technology produces excellent video quality scores across a very wide variety of scene types and compression levels.

Computer System

Figure 8:
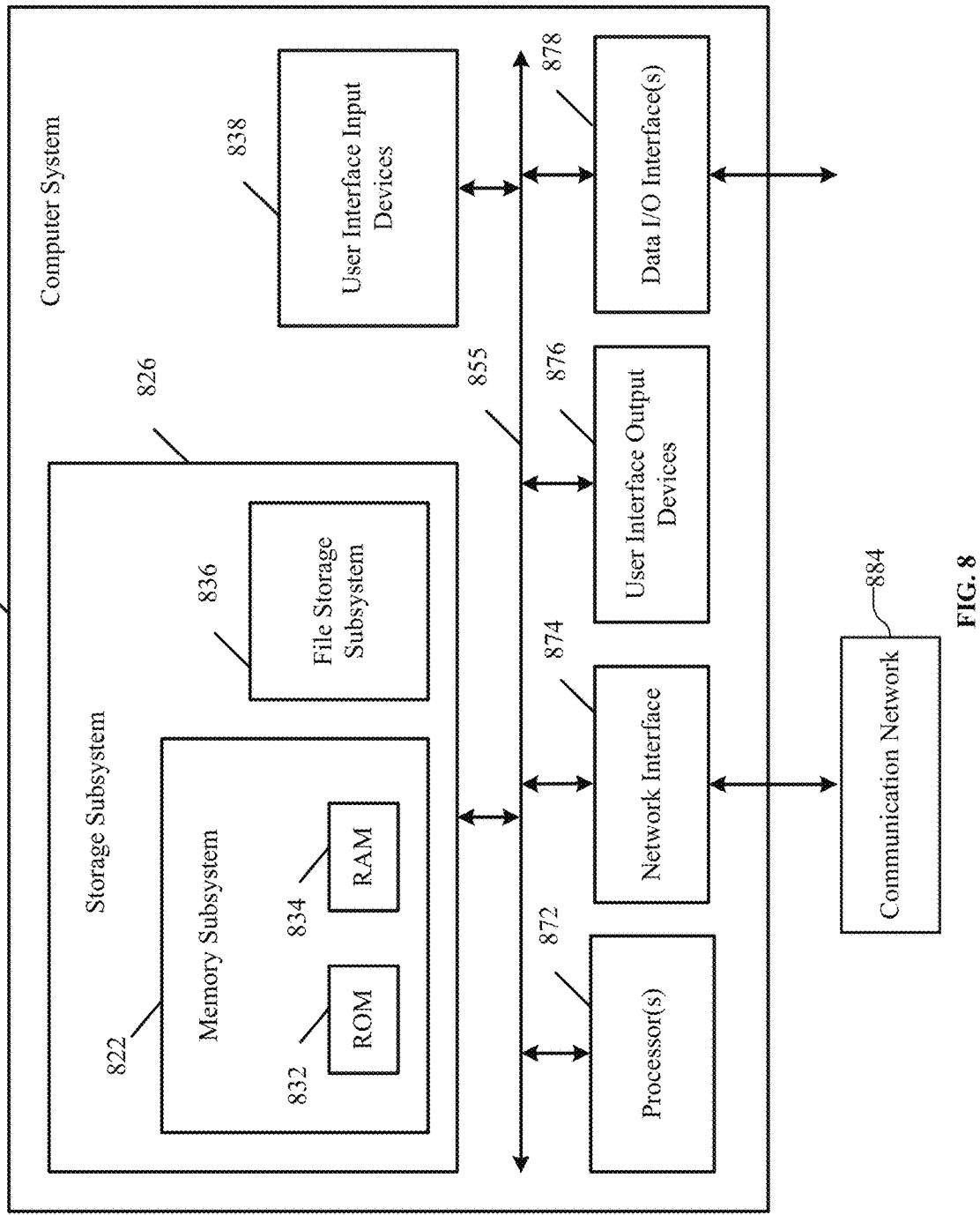
FIG. 8 depicts a block diagram of an exemplary system for using FR video and FR VMOS and generating synthetically impaired videos, using filters tuned to generate impairments that approximate the reference FR VMOS video and score, and using the synthetically impaired video as data to train machine learning models to produce no-reference NR VMOS scoring, according to one implementation of the technology disclosed. The exemplary system is also usable for generating a no-reference video mean opinion score (NR VMOS) using a trained NR VMOS score generator.

FIG. 8 is a simplified block diagram of a computer system 800 that can be utilized for using FR video and FR VMOS and generating synthetically impaired videos, using filters tuned to generate impairments that approximate the reference FR VMOS video and score, and using the synthetically impaired video as data to train machine learning models to produce no-reference NR VMOS scoring, according to one implementation of the technology disclosed. Computer system 800 is also usable for generating a no-reference video mean opinion score (NR VMOS) using a trained NR VMOS score generator.

Computer system 800 includes at least one central processing unit (CPU) 872 that communicates with a number of peripheral devices via bus subsystem 855. These peripheral devices can include a storage subsystem 810 including, for example, memory devices and a file storage subsystem 836, user interface input devices 838, user interface output devices 876, and a network interface subsystem 874. The input and output devices allow user interaction with computer system 800. Network interface subsystem 874 provides an interface to outside networks, including an interface to corresponding interface devices in other computer systems.

In one implementation, the training set generator, ground truth generator and NR VQA classifier of FIG. 1 can be communicably linked to the storage subsystem 810 and the user interface input devices 838 can be communicably linked to performance benchmark analysis interface of FIG. 2. User interface input devices 838 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 800.

User interface output devices 876 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 800 to the user or to another machine or computer system.

Storage subsystem 810 stores programming and data constructs that provide the functionality of some or all of the modules and methods described herein.

Memory subsystem 822 used in the storage subsystem 810 can include a number of memories including a main random access memory (RAM) 832 for storage of instructions and data during program execution and a read only memory (ROM) 834 in which fixed instructions are stored. A file storage subsystem 836 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 836 in the storage subsystem 810, or in other machines accessible by the processor.

Bus subsystem 855 provides a mechanism for letting the various components and subsystems of computer system 810 communicate with each other as intended. Although bus subsystem 855 is shown schematically as a single bus, alternative implementations of the bus subsystem can use multiple busses.

Computer system 810 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 800 depicted in FIG. 8 is intended only as a specific example for purposes of illustrating the preferred embodiments of the present invention. Many other configurations of computer system 800 are possible having more or less components than the computer system depicted in FIG. 8.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

Some Particular Implementations

Some particular implementations and features are described in the following discussion.

In one implementation, a disclosed tangible non-transitory computer readable storage media is impressed with computer program instructions that, when executed on a processor, cause the processor to implement a method of training a no-reference video mean opinion score (NR VMOS) score generator. The disclosed method includes generating synthetically impaired images from full reference (FR) video, using filters tuned to generate impaired versions of unimpaired FR images from the FR video. The method also includes applying a FR video mean opinion score (FR VMOS) generator to pairs of the unimpaired FR images and the impaired versions of the FR images to create ground truth scores for the impaired versions. The method further includes training by machine learning model an image evaluation classifier using the ground truth scores and the impaired versions to generate NR VMOS scores, and storing coefficients of the image evaluation classifier for use as the NR VMOS score generator.

This architecture and other implementations of the technology disclosed can include one or more of the following features and/or features described in connection with additional architectures disclosed. In the interest of conciseness, the combinations of features disclosed in this application are not individually enumerated and are not repeated with each base set of features.

In some implementations of the disclosed tangible non-transitory computer readable storage media, the unimpaired FR images from the FR video are selected from a series of scenes and the filters tuned to generate impaired versions from the FR video approximate effects of constrained video delivery bandwidth.

In one implementation, the disclosed method further includes generating 50,000 to 10,000,000 synthetically impaired images for use in the applying and the training. In another implementation, the disclosed method includes generating 100,000 to 1,000,000 synthetically impaired images for use in the applying and the training.

In some implementations, the disclosed machine learning model is a support vector machine (SVM) model. In other implementations, the disclosed machine learning model is a convolutional neural network (CNN) model.

In another implementation, a disclosed system includes one or more processors coupled to memory, the memory loaded with computer instructions, when executed on the processors, implement actions of the disclosed method described supra.

One implementation includes a disclosed computer-implemented method for training a no-reference video mean opinion score (NR VMOS) score generator, including executing on a processor the program instructions from the non-transitory computer readable storage media, to implement the generating, applying, training and storing.

In one implementation, a disclosed tangible non-transitory computer readable storage media is impressed with computer program instructions that, when executed a processor, cause the processor to implement a method of generating a no-reference video mean opinion score (NR VMOS) using a trained NR VMOS score generator. The disclosed method includes invoking the trained NR VMOS score generator that includes stored coefficients generated by training an image evaluation classifier using unimpaired and impaired images from a full reference (FR) video. The method also includes feeding the trained NR VMOS score generator with at least three images captured from different scenes in a video sequence to be scored, and evaluating the images to generate NR VMOS scores. The disclosed method further includes combining the NR VMOS scores from least three images to generate a sequence NR VMOS score for the video sequence.

In some implementations of the disclosed method, at least three images are separated by at least three seconds of video sequence between respective images. For some implementations, the video sequence NR VMOS score for the video sequence satisfies a predetermined correlation with standards-based FR VMOS scores, such as VMAF described supra.

The technology disclosed can be practiced as a system, method, or article of manufacture. One or more features of an implementation can be combined with the base implementation. Implementations that are not mutually exclusive are taught to be combinable. One or more features of an implementation can be combined with other implementations.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim as follows:

1. A tangible non-transitory computer readable storage media impressed with computer program instructions that, when executed on a processor, cause the processor to implement a method of training a no-reference video mean opinion score (abbreviated NR VMOS) score generator, the method including:
  generating synthetically impaired images selected from a series of scenes in a full reference (abbreviated FR) video, using filters tuned to generate impaired versions of unimpaired FR images from the FR video;
  applying a FR video mean opinion score (abbreviated FR VMOS) generator to pairs of the unimpaired FR images and the impaired versions of the FR images to create ground truth scores for the impaired versions;
  training by CNN machine learning model an image evaluation classifier using individual ground truth scores and corresponding impaired versions to generate NR VMOS scores for the series of scenes; and
  storing coefficients of the image evaluation classifier for use as the NR VMOS score generator.

2. The tangible non-transitory computer readable storage media of claim 1, wherein:
  the filters tuned to generate impaired versions from the FR video approximate effects of constrained video delivery bandwidth.

3. The tangible non-transitory computer readable storage media of claim 1, further including generating 50,000 to 10,000,000 synthetically impaired images for use in the applying and the training.

4. The tangible non-transitory computer readable storage media of claim 1, further including generating 100,000 to 1,000,000 synthetically impaired images for use in the applying and the training.

5. The tangible non-transitory computer readable storage media of claim 1, wherein the machine learning model is a support vector machine (abbreviated SVM) model.

6. The tangible non-transitory computer readable storage media of claim 1, wherein the machine learning model is a convolutional neural network (abbreviated CNN) model.

7. A computer-implemented method for training a no-reference video mean opinion score (abbreviated NR VMOS) score generator, including executing on a processor the program instructions from the non-transitory computer readable storage media of claim 1, to implement the generating, applying, training and storing.

8. A computer-implemented method for training a no-reference video mean opinion score (abbreviated NR VMOS) score generator, including executing on a processor the program instructions from the non-transitory computer readable storage media of claim 2, to implement the generating, applying, training and storing.

9. A computer-implemented method for training a no-reference video mean opinion score (abbreviated NR VMOS) score generator, including executing on a processor the program instructions from the non-transitory computer readable storage media of claim 5, to implement the generating, applying, training and storing.

10. A computer-implemented method for training a no-reference video mean opinion score (abbreviated NR VMOS) score generator, including executing on a processor the program instructions from the non-transitory computer readable storage media of claim 6, to implement the generating, applying, training and storing.

11. A system for training a no-reference video mean opinion score (abbreviated NR VMOS) score generator, the system including a processor, memory coupled to the processor, and computer instructions from the non-transitory computer readable storage media of claim 1 loaded into the memory.

12. The system of claim 11, wherein:
  the filters tuned to generate impaired versions from the FR video approximate effects of constrained video delivery bandwidth.

13. The system of claim 11, wherein the machine learning model is a support vector machine (abbreviated SVM) model.

14. The system of claim 11, wherein the machine learning model is a convolutional neural network (abbreviated CNN) model.

15. A tangible non-transitory computer readable storage media impressed with computer program instructions that, when executed a processor, cause the processor to implement a method of generating a no-reference video mean opinion score (abbreviated NR VMOS) using a trained NR VMOS score generator, the method including:
  invoking the trained NR VMOS score generator that includes stored coefficients generated by training an image evaluation classifier using individual ground truth scores generated by a full reference (FR) VMOS evaluation system applied to corresponding synthetically impaired versions of reference images from series of scenes in video sequences;
  feeding the trained NR VMOS score generator with a series of at least three images captured from different scenes in a video sequence to be scored;
  evaluating the series of at least three images to generate NR VMOS scores; and
  combining the NR VMOS scores from the least three images to generate a sequence NR VMOS score for the video sequence.

16. The tangible non-transitory computer readable storage media of claim 15, wherein the at least three images are separated by at least three seconds of video sequence between respective images.

17. The tangible non-transitory computer readable storage media of claim 15, wherein the sequence NR VMOS score for the video sequence satisfies a predetermined correlation with standards-based FR VMOS scores.

18. A system for generating a no-reference video mean opinion score (abbreviated NR VMOS) using a trained NR VMOS score generator, the system including a processor, memory coupled to the processor, and computer instructions from the non-transitory computer readable storage media of claim 15 loaded into the memory.

19. A computer-implemented method for generating a no-reference video mean opinion score (abbreviated NR VMOS) using a trained NR VMOS score generator, including executing on a processor the program instructions from the non-transitory computer readable storage media of claim 15.

* * * * *